(12) United States Patent
Rey

(10) Patent No.: US 7,531,600 B1
(45) Date of Patent: May 12, 2009

(54) WATER-IN-OIL POLYMER EMULSION CONTAINING MICROPARTICLES

(75) Inventor: Paul Rey, Pittsburgh, PA (US)

(73) Assignee: Kroff Chemical Company, Pittsburgh, PA (US)

(*) Notice: Subject to any disclaimer, the term of this patent is extended or adjusted under 35 U.S.C. 154(b) by 82 days.

(21) Appl. No.: 10/988,424

(22) Filed: Nov. 12, 2004

Related U.S. Application Data

(60) Provisional application No. 60/519,244, filed on Nov. 12, 2003.

(51) Int. Cl.
*C08F 2/32* (2006.01)
*C02F 1/00* (2006.01)
*C02F 1/56* (2006.01)

(52) U.S. Cl. .............. 524/801; 524/727; 210/698; 210/701

(58) Field of Classification Search ............... 524/801, 524/727; 210/698, 701
See application file for complete search history.

(56) References Cited

U.S. PATENT DOCUMENTS

| | | | |
|---|---|---|---|
| 3,041,318 A | 6/1962 | Hess | |
| 3,278,506 A | 10/1966 | Charmot et al. | |
| 3,284,393 A | 11/1966 | Vanderhoff et al. | |
| 3,624,019 A | 11/1971 | Anderson et al. | |
| 3,646,997 A | 3/1972 | Chenevert | |
| 3,826,771 A | 7/1974 | Anderson et al. | |
| 3,841,402 A | 10/1974 | Knight et al. | |
| 3,868,999 A * | 3/1975 | Christopher et al. | 166/292 |
| 4,024,097 A | 5/1977 | Slovinsky et al. | |
| 4,070,323 A | 1/1978 | Vanderhoff et al. | |
| 4,233,165 A * | 11/1980 | Salathiel et al. | 507/200 |
| 4,460,627 A | 7/1984 | Weaver et al. | |
| 4,524,003 A | 6/1985 | Borchardt | |
| 4,579,667 A | 4/1986 | Echt et al. | |
| 4,643,801 A | 2/1987 | Johnson | |
| 4,672,090 A | 6/1987 | Chan | |
| 4,772,659 A | 9/1988 | Chan | |
| 4,783,492 A | 11/1988 | Dovan et al. | |
| 4,935,456 A | 6/1990 | Huang et al. | |
| 4,977,962 A | 12/1990 | Himes et al. | |
| 5,102,558 A | 4/1992 | McDougall et al. | |
| 5,278,203 A | 1/1994 | Harms | |
| 6,200,420 B1 | 3/2001 | Begala et al. | |
| 6,342,468 B1 | 1/2002 | Geib | |
| 6,395,134 B1 | 5/2002 | Chen et al. | |
| 6,413,433 B1 | 7/2002 | Maury et al. | |
| 6,454,902 B1 | 9/2002 | Chen | |
| 6,488,091 B1 | 12/2002 | Weaver et al. | |
| 6,517,677 B1 | 2/2003 | Cardile et al. | |
| 2003/0008779 A1 | 1/2003 | Chen et al. | |

FOREIGN PATENT DOCUMENTS

| | | |
|---|---|---|
| JP | 2000-248273 A | 9/2000 |
| JP | 2000248273 A * | 9/2000 |

OTHER PUBLICATIONS

John L. Gidley et al., *Recent Advances in Hydraulic Fracturing*, Monograph vol. 12, SPE, Henry L. Doherty Series. Copyright 1989, Chapter 6, pp. 109-130.
http://www.sigmaaldrich.com/catalog/search/ProductDetail?ProdNo=S6760&Brand=SIGMA, May 30, 2007.

* cited by examiner

*Primary Examiner*—Kelechi C Egwim
(74) *Attorney, Agent, or Firm*—The Webb Law Firm

(57) ABSTRACT

A storage stable water-in-oil emulsion composition that includes 5% to 99% by weight of a water-in-oil emulsion polymer including a polymer or copolymer containing repeat units from an acrylamide monomer; 0.1% to 10% by weight of one or more inorganic microparticles; 0.5% to 90% by weight of a carrier solvent; and 0 to 90% by weight of a fluidizing agent. The compositions can be used to treat aqueous systems including paper processing, sludge dewatering and for fracturing fluids for subterranean formations.

63 Claims, No Drawings

WATER-IN-OIL POLYMER EMULSION CONTAINING MICROPARTICLES

CROSS-REFERENCE TO RELATED APPLICATION

This application claims the benefit of priority to U.S. Provisional Application No. 60/519,244 filed Nov. 12, 2003, entitled "Water-In-Oil Polymer Emulsion Containing Microparticles," and is related to copending application Ser. No. 10/988,216 entitled "Method of Fracturing Formations" filed Nov. 12, 2004, the disclosure of both of which are herein incorporated by reference in their entirety.

TECHNICAL FIELD OF THE INVENTION

The present invention relates to water-in-oil polymer emulsion compositions and particularly to water-in-oil polymer emulsion compositions in which the polymer is prepared from a monomer mixture that includes acrylamide.

BACKGROUND OF THE INVENTION

Water-soluble polymers can be prepared in several forms. For instance, it is known in the art that water-soluble polymers can be dispersed in the oil phase of water-in-oil emulsions. Conventional water-in-oil emulsion polymerization techniques generally involve forming a water-in-oil emulsion of an aqueous solution of at least one water-soluble ethylenically unsaturated monomer in an inert hydrophobic liquid organic dispersion medium and polymerizing the monomer or monomers in the dispersion medium to form a polymer emulsion.

In such polymerization methods, virtually any polymerizable ethylenically unsaturated water-soluble monomer can be polymerized and dispersed into a water-in-oil system. Thus, anionic, cationic, nonionic, and amphoteric emulsion polymers can be prepared by conventional emulsion polymerization techniques.

Water-in-oil emulsions generally include three primary components: (1) a hydrophobic or oil phase; (2) an aqueous phase; and (3) a surfactant system. The oil phase generally makes up from 5 to 75%, by weight, of the emulsion. Any inert hydrophobic liquid can be used as the oil phase. Typical hydrophobic liquids include, but are not limited to, benzene, xylene, toluene, mineral oils, kerosene, napthas, petroleums, petroleum distillates, branch-chain hydrocarbons, branch-chain isoparaffinic hydrocarbons, and blends of aromatic and aliphatic hydrocarbons containing 4 or greater carbon atoms.

The aqueous phase generally accounts for from 25 to 95% by weight of the emulsion. This phase contains the desired ethylenically unsaturated monomer or monomers and water. Additionally, this phase may contain an effective amount of a chelating agent, such as a sodium salt of ethylene diamine tetraacetic acid (EDTA) or nitrilotriacetate (NTA), buffers, chain transfer agents, or other additives. The monomer(s) to be polymerized typically make up about 10 to about 60% by weight of the aqueous phase, with the balance being primarily water.

The surfactant system generally makes up 0.5 to 20% by weight of the emulsion. Any surfactant system which effectively disperses an aqueous phase into a hydrophobic phase can be used. See, for example, U.S. Pat. No. 3,826,771, which discloses the use of sorbitan monooleate as a water-in-oil emulsifying agent; U.S. Pat. No. 3,278,506, which discloses the use of ethylene oxide condensates of fatty acid amides as emulsifiers; U.S. Pat. No. 3,284,393, which discloses the use of hexadecyl sodium phthalate, sorbitan monooleate, sorbitan monostearate, cetyl or stearyl sodium phthalate and metal soaps as water-in-oil emulsifiers; and U.S. Pat. No. 4,024,097, which discloses the use of surfactant systems comprising an oil-soluble alkanolamide, as well as one or more co-emulsifiers selected from unesterified dialkanol fatty amides, quaternized ammonium salts of fatty tertiary amines, salts of fatty tertiary amines, alkaline metal salts of fatty acids, and alkyl or alkylaryl sulfates or sulfonates.

Emulsion polymers are generally produced by first mixing the surfactant system with the hydrophobic phase. The aqueous phase is then typically prepared by adding the monomer(s) to water in the desired concentration. Additionally, a chelant, such as a sodium salt of EDTA, may be added to the aqueous solution and the pH of the aqueous phase may be adjusted to between about 3.0 and 10.0, depending on the monomer(s) used. The aqueous monomer phase is then added to the mix containing the hydrophobic liquid and the surfactant system. The surfactant system enables the aqueous phase, which contains the monomer or monomers to be polymerized, to be emulsified into the hydrophobic phase. Polymerization is then carried out in the presence of a free radical generating catalyst, and the temperature of the reaction mixture is generally maintained between about 5° C. and about 100° C., resulting in a water-in-oil emulsion polymer. Any type of free radical initiator can be used including, for example, persulfate and azo initiators. High-energy irradiation can also be used to initiate polymerization.

The following patents provide further background relative to the manufacture of emulsion polymers or for the application of polymers in combination with microparticles for enhanced process performance.

U.S. Pat. No. 3,041,318 to Hess discloses emulsifying an aqueous dispersion of a polymer prepared from a compound containing a polymerizable ethylenically unsaturated group into a water-in-oil emulsion, and then precipitating the polymer therefrom as discrete particles.

U.S. Pat. No. 3,284,393 to Vanderhoff et al. discloses a water-in-oil emulsion polymerization process wherein a water-soluble monomer is emulsified in an oil phase and polymerized therein, resulting in a polymeric latex which is then separated from the reaction medium.

U.S. Pat. No. 4,579,667 to Echt et al. discloses gelled aqueous compositions containing an anionic partially hydrolyzed polyacrylamide and a water-soluble cationic polyamide-epihalohydrin resin useful in fracturing oil and gas formations in enhanced oil recovery. The polymers can be prepared by solution polymerization, precipitation polymerization, water-in-oil emulsion polymerization, and water-in-oil suspension polymerization. The gels can be used to suspend propping agents, to reduce water loss by serving as a plugging agent, and as a "pusher" in surfactant flooding.

U.S. Pat. No. 6,488,091 to Weaver et al. discloses subterranean formation treating fluid concentrates that include water and a substantially fully hydrated depolymerized polymer. The treating fluids which are formed by adding water to the treating fluid concentrates include water, a substantially fully hydrated depolymerized polymer, and a crosslinking agent for crosslinking the hydrated depolymerized polymer.

U.S. Pat. No. 6,454,902 to Chen discloses a process for making paper by forming a cellulosic suspension, flocculating the suspension, draining the suspension on a screen to form a sheet and then drying the sheet. The cellulosic suspension is flocculated by addition of a water-soluble polymer which is selected from a polysaccharide or a synthetic polymer of intrinsic viscosity of at least 4 dl/g and then refloccu-lated by a subsequent addition of a reflocculating system, wherein the reflocculating system comprises a siliceous material and a water-soluble polymer.

U.S. Pat. No. 6,413,433 to Maury et al. discloses a process for dewatering sludge that contains solids and water. The method includes the steps of adding a cationic dispersion polymer and a microparticle to the sludge, where the cationic dispersion polymer can be added before or after or simultaneously with the addition of the microparticle, and physically separating the solids from said water.

Although there are numerous applications where water-soluble polymers are added to treat aqueous systems in conjunction with various microparticles, the methods are cumbersome because they require separately feeding a polymer and a microparticle to a system. It would be highly desirable to add the microparticle and the polymer in a single composition that could be prepared prior to use and be able to be stored prior to use for a reasonable period of time.

SUMMARY OF THE INVENTION

The present invention provides a storage stable water-in-oil emulsion composition that includes:
- 5% to 99% by weight of a water-in-oil emulsion polymer including a polymer or copolymer containing repeat units from an acrylamide monomer;
- 0.1% to 10% by weight of one or more inorganic microparticles;
- 0.5% to 90% by weight of a carrier solvent; and
- 0 to 90% by weight of a fluidizing agent.

The present invention is also directed to compositions and methods for using the above-described water-in-oil emulsion composition to treat aqueous systems including paper processing, sludge dewatering and fracturing fluids for subterranean formations.

DETAILED DESCRIPTION OF THE INVENTION

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

As used herein, "alkyl" refers to an acyclic or cyclic, saturated hydrocarbon group having a carbon chain length of, for example, from $C_1$ to $C_{25}$. Nonlimiting examples of suitable alkyl groups include, but are not limited to, $—(CH_2)_3CH_3$, $—(CH_2)_4CH_3$, $—(CH_2)_5CH_3$, $—(CH_2)_{10}CH_3$, $—(CH_2)_{23}CH_3$, and cyclohexyl. "Alkylene" refers to a divalent alkyl group.

As used herein, the term "aryl" refers to aromatic groups that include, without limitation, groups such as phenyl, biphenyl, benzyl, xylyl, napthalenyl, anthracenyl, and the like, as well as heterocyclic aromatic groups that include, without limitation, pyridinyl, pyrrolyl, furanyl, thiophenyl, and the like. "Arylene" refers to a divalent aryl group.

As used herein, "alkaryl" refers to an acyclic alkyl group substituted with at least one aryl group, for example, phenyl, and having an alkyl carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. "Alkarylene" refers to a divalent, alkaryl group.

As used herein, "aralkyl" refers to an aryl group substituted with at least one acyclic alkyl group, for example, phenyl, having an alkyl substituent group with a carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. The alkyl group can be substituted with halogens. "Aralkylene" refers to a divalent aralkyl group.

As used herein, "alkenyl" refers to an acyclic or cyclic hydrocarbon group having one or more double bonds and having an alkenyl carbon chain length of $C_2$ to $C_{25}$. As used herein, "alkenylene" refers to acyclic or cyclic hydrocarbon groups having one or more double bonds and having an alkenylene carbon chain length of $C_2$ to $C_{25}$.

As used herein the term "water-in-oil emulsion polymer" refers to a system or composition having a hydrophobic liquid as a continuous phase and an aqueous solution or gel as a dispersed phase, where the aqueous phase includes one or more water soluble or water dispersible polymers. The dispersed phase, present as droplets and/or discrete microgels, can have size ranging from at least 10 nm, in some cases at least 100 nm, in other cases at least 1 micron, and in some situations at least 5 microns and may be up to 500 microns, in some cases up to 250 microns, in other cases up to 100 microns, in some situations up to 50 microns, and in other situations up to 10 microns. The size of the droplet and/or discrete microgel dispersed aqueous phase can vary between any of the values recited above. The size of the droplets and/or discrete microgels can be determined by light scattering and/or scanning electron microscopy as is known in the art.

As used herein, the term "polymer" refers to a water soluble or water dispersible polymer without reference to the current or past form which may include aqueous solution, dry, bead, gel, or gel within a dispersed phase. The term "polymer" is meant to include homopolymers, copolymers, terpolymers, etc., as well as polymer complexes.

As used herein, the phrase "repeat units from an acrylamide monomer" is meant to indicate not only the monomer acrylamide, but also analogous repeat units, non-limiting examples being methacrylamide, N-methylacrylamide, and N,N-dimethylacrylamide; functionalized extensions of acrylamide, a non-limiting example being acrylamidomethylpropane sulfonic acid; hydrolysis products of acrylamide, a non-limiting example being acrylic acid and acrylic and methacrylic acid esters. Formula I, as detailed below, provides a non-limiting description of repeat units from an acrylamide monomer according to the invention.

As used herein, the term "carrier solvent" refers to a liquid that carries the microparticles into the water-in-oil emulsion of the invention. As is described below, the microparticles are mixed, dissolved and/or dispersed in the carrier solvent, which is then added to the water-in-oil emulsion polymer.

As used herein, the term "fluidizing agent" refers to a liquid that is added to the water-in-oil emulsion of the invention to adjust and provide desired rheological properties, including, but not limited to, flow properties and viscosity.

As used herein, the term "Hansen Solubility Parameter" refers to the system of describing solute solubility in a solvent based on the parameters $\delta_d$ (nonpolar parameter), $\delta_p$ (polar parameter), $\delta_h$ (hydrogen bonding parameter), and $\delta_t$ (total solubility parameter). See Sinha et al., "Computer Aided Solvent Design For Lithographic Blanket Wash System," Annual AICHE Meeting, 1998.

The present invention provides a water-in-oil emulsion composition that includes:

5% to 99% by weight of a water-in-oil emulsion polymer comprising a polymer or copolymer containing repeat units from an acrylamide monomer;

0.1% to 10% by weight of one or more inorganic microparticles;

0.5% to 90% by weight of a carrier solvent; and 0 to 90% by weight of a fluidizing agent.

The total of all components is always 100% by weight.

Any suitable water-in-oil emulsion polymer can be used in the present invention. Suitable water-in-oil emulsion polymers include water-in-oil emulsion polymers containing homopolymers, copolymers, terpolymer, etc., as well as polymer blends containing repeat units derived from acrylamide in the polymer molecule. In an embodiment of the present invention, the water-in-oil emulsion polymer includes a hydrophobic oil phase, a surfactant system, and a polymer-containing aqueous phase comprising water and the polymer or copolymer containing repeat units from an acrylamide monomer. Commercially available "water-in-oil emulsion polymers" that can be used in the present invention include, but are not limited to, KR-F2311, KR-F2375, KR-F3230 and KR-F5315 from Kroff Chemical Company, Inc.

In an embodiment of the invention, any suitable hydrophobic liquid can be used in the oil phase. Suitable hydrophobic liquids are those that provide stable water-in-oil emulsion polymers. As used herein, the term "stable water-in-oil emulsion polymers" refers to water-in-oil emulsion polymers where the dispersed aqueous phase does not substantially separate from the hydrophobic oil phase and any minimal separation that does occur is reversible by means of mixing, shaking, or stirring the water-in-oil emulsion polymer. Suitable hydrophobic liquids for use in the oil phase include, but are not limited to, mineral oil, synthetic oil, modified oil, paraffinic oil, benzene, xylene, toluene, mineral oils, kerosene, napthas, petroleums, and blends of aromatic and aliphatic hydrocarbons containing 4 or greater carbon atoms and vegetable oil. Examples of suitable hydrophobic liquids that may be used include, but are not limited to, paraffinic hydrocarbon oils described in U.S. Pat. No. 3,624,019 to Anderson et al., dearomatized hydrocarbon fluids sold under the trade names Exxsol™, Isopar™, and Norpar™, by Exxon Mobil Corporation, Houston, Tex., and petroleum distillates sold under the trade name Kensol® by American Refining Group, Inc., Bradford, Pa.

In an embodiment of the invention, the hydrophobic oil phase makes up at least 10%, in some cases at least 15%, in other cases at least 20% and in some situations at least 25% by weight of the water-in-oil emulsion polymer. Also, the hydrophobic oil phase is present at up to 90%, in some cases up to 80%, in other cases up to 70%, in some situations up to 60% and in other situations up to 50% by weight of the water-in-oil emulsion polymer. The amount of hydrophobic oil phase in the water-in-oil emulsion polymer can vary between any of the values recited above.

In an embodiment of the invention, any suitable surfactant system can be used in the oil phase. Suitable surfactant systems are those that provide stable water-in-oil emulsion polymers. Examples of surfactants that can be used in the surfactant system of the present invention include, but are not limited to, alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylates with 1 to 30 oxypropylene units, $C_6$-$C_{22}$ linear or branched alkyl ethoxylates/propoxylates with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, ethylene oxide condensates of fatty acid amides, and mixtures thereof. Non-limiting examples of suitable surfactant systems are disclosed in U.S. Pat. Nos. 4,672,090 and 4,772,659 to Chan, 4,935,456 to Huang et al., 3,826,771 to Anderson et al., 3,278,506 to Charmot et al., 3,284,393 to Vanderhoff et al., and 4,070,323 to Vanderhoff et al., the disclosures of which are herein incorporated by reference.

In an embodiment of the invention, the surfactant system makes up at least 0.1%, in some cases at least 0.5%, in other cases at least 0.75% and in some situations at least 1% by weight of the water-in-oil emulsion polymer. Also, the surfactant system is present at up to 10%, in some cases up to 8%, in other cases up to 7%, in some situations up to 6% and in other situations up to 5% by weight of the water-in-oil emulsion polymer. The amount of the surfactant system in the water-in-oil emulsion polymer can vary between any of the values recited above.

In an embodiment of the invention, the polymer-containing aqueous phase including water and the polymer or copolymer containing repeat units from an acrylamide monomer makes up at least 5%, in some cases at least 7.5%, in other cases at least 10% and in some situations at least 12.5% by weight of the water-in-oil emulsion polymer. Also, the aqueous phase is present at up to 90%, in some cases up to 80%, in other cases up to 70%, in some situations up to 60% and in other situations up to 50% by weight of the water-in-oil emulsion polymer. The amount of aqueous phase in the water-in-oil emulsion polymer can vary between any of the values recited above.

In an embodiment of the invention, the polymer or copolymer containing repeat units from an acrylamide monomer in the aqueous phase makes up at least 2%, in some cases at least 3%, in other cases at least 5% and in some situations at least 10% by weight of the water-in-oil emulsion polymer. Also, the polymer or copolymer in the aqueous phase is present at up to 89.5%, in some cases up to 80%, in other cases up to 70%, in some situations up to 60% and in other situations up to 50% by weight of the water-in-oil emulsion polymer. The amount of polymer or copolymer in the aqueous phase in the water-in-oil emulsion polymer can vary between any of the values recited above.

In an embodiment of the invention, the polymer or copolymer of the aqueous phase is selected from non-ionic poly (acrylamide) homopolymers, non-ionic copolymers, anionic copolymers, cationic copolymers, amphoteric copolymers, and ampholytic copolymers.

As used herein, the term "anionic copolymer" refers to polymers containing acrylamide repeat units and repeat units from a monomer that can carry a negative charge at an appropriate pH and/or when neutralized with a suitable cation, non-limiting examples being acrylic acid, methacrylic acid, and acrylamidomethylpropanesulfonic acid.

As used herein, the term "cationic copolymer" refers to polymers containing acrylamide repeat units and repeat units from a monomer that carries a positive charge, non-limiting examples being methacrylamidopropyltrimethyl ammonium chloride, methacryloyloxyethyl trimethyl ammonium methylsulfate, and dimethyl diallyl ammonium chloride.

As used herein, the term "amphoteric copolymer" refers to polymers containing acrylamide repeat units and repeat units from a monomer that carries a positive charge at an appropriate pH⁻ and a monomer that carries a negative charge at an appropriate pH. Non-limiting examples of the former are methacrylamidopropyldimethylamine, methacryloyloxyethyldimethylamine and methyl diallyl amine, and the latter are acrylic acid, methacrylic acid and maleic acid.

As used herein, the term "ampholytic copolymer" refers to polymers containing acrylamide repeat units and repeat units from a monomer that carries a positive charge and a monomer that carries a negative charge at an appropriate pH. Non-limiting examples of the former are methacrylamidopropyl-trimethyl ammonium chloride, methacryloyloxyethyl trimethyl ammonium methylsulfate, acryloyloxyethyl trimethyl ammonium chloride and dimethyl diallyl ammonium chloride, and the latter are acrylic acid, methacrylic acid and maleic acid.

In an embodiment of the present invention, the repeat units from an acrylamide monomer in the polymer or copolymer include one or more repeat units according to Formula I:

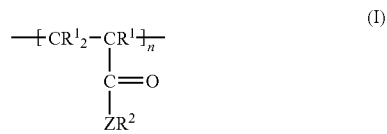

where each occurrence of $R^1$ is independently selected from H, methyl, and ethyl; n is an integer from 10 to 10,000,000; Z is selected from —O— and —NR²—; and each occurrence of $R^2$ is independently selected from the group consisting of H, $C_1$-$C_{22}$ linear, branched, or cyclic alkyl, aryl, alkaryl, aralkyl or alkenyl, a group —$R^3$—$NR^2_2$, a group —$R^3$—$N^+R^2_3$ X, and a group —$R^3$—$SO_3Y$, wherein $R^2$ is as previously defined; $R^3$ is a divalent linking group selected from the group consisting of $C_1$-$C_{22}$ linear, branched, or cyclic alkylene, arylene, alkarylene, aralkylene, or alkenylene, poly(ethyleneoxide) and poly(propyleneoxide); Y is H or an alkali metal ion; and X is a halide or methylsulfate. When referred to as a divalent linking group, poly(ethyleneoxide) refers to polyethoxy repeat units and poly(propyleneoxide) refers to polypropoxy repeat units that link the indicated species together.

In a particular embodiment of the invention, the copolymer of the aqueous phase includes repeat units derived from acrylamide and repeat units derived from one or more monomers selected from acrylamidopropyl trimethyl ammonium chloride (APTAC), methacrylamidopropyltrimethyl ammonium chloride (MAPTAC), methacryloyloxyethyl trimethyl ammonium chloride (METAC), methacryloyloxyethyl trimethyl ammonium methylsulfate (METAMS), acryloyloxyethyl trimethyl ammonium chloride (AETAC), dimethyl diallyl ammonium chloride (DMDAAC), acrylic acid (AA), methacrylic acid (MAA), 2-acrylamido-2-methylpropane sulfonic acid (AMPSA), 2-methacrylamido-2-methylpropane sulfonic acid (MAMPSA), $C_1$-$C_3$ alkyl acrylate, $C_1$-$C_3$ alkyl methacrylate, n-alkyl acrylamide, methacrylamide, n-alkylmethacrylamide, and/or diacetone acrylamide.

The molecular weight of the polymer or copolymer in the water-in-oil emulsion polymer is typically approximated by measuring the reduced viscosity of a solution of the polymer using an appropriately sized Ubbelohde Capillary Viscometer at 0.05 g/dl in 1N NaCl at 30° C. and pH of 7. In an embodiment of the invention, the polymer or copolymer of the aqueous phase has a reduced viscosity of at least 5 dl/g, in some cases at least 6 dl/g, in some situations at least 8 dl/g and in other situations at least 10 dl/g. Also, the polymer or copolymer of the aqueous phase has a reduced viscosity of up to 50 dl/g, in some cases up to 35 dl/g and in other cases up to 20 dl/g. The reduced viscosity of the polymer or copolymer can vary between any of the values recited above.

Although the molecular weight of the polymer or copolymer can be difficult to determine, it can be measured using gel permeation chromatography (GPC) using acrylamide or poly (styrene sulfonate) standards as is known in the art. As such, the molecular weight of the polymer or copolymer can be at least 10,000, in some cases at least 25,000 and in other cases at least 50,000. Also, the molecular weight can be up to 50,000,000, in some cases up to 10,000,000 and in other cases up to 1,000,000 as measured using GPC techniques. The molecular weight of the polymer or copolymer can vary between any of the values recited above.

In the invention, one or more inorganic microparticles are part of the water-in-oil emulsion composition. As used herein, the term "microparticle" is meant to mean solid particles with very small dimensions, which can range from nanometers to microns.

In an embodiment of the present invention, any suitable inorganic microparticle can be used. Suitable inorganic microparticles include, but are not limited to, fumed silica, fumed alumina, precipitated silica, colloidal silica, alumina silicates, treated silica, calcium carbonate, silica flour, diatomites, talc, borosilicates, and mixtures thereof. As non-limiting examples, the inorganic microparticles can include the Cab-O-Sil® and Cab-O-Sperse® fumed products available from Cabot Corporation, Tuscola, Ill.; Sipermat® and Acemat® precipitated silicas and silicates available from Degussa Corporation, Parsippany, N.J.; LUDOX® colloidal silicas available from W.R. Grace & Co., Columbia, Md.; REMSOL® colloidal silica available from REMET UK Ltd., Crayford, Kent, UK; ground calcium carbonate and precipitated calcium carbonate such as those products available from Imerys SA, Paris, France; and the microparticles disclosed in U.S. Pat. No. 6,517,677 to Cardile et al. at col. 9, lines 20-67, the disclosure of which is hereby incorporated by reference. Treated silicas can include surface treated or surface modified silica that has been treated with organic materials (hydrophobic silica) or alumina (alumina treated silica) as is known in the art. Non-limiting examples of treated silicas that can be used include the Cab-O-Sil® TS products available from Cabot Corporation.

In a particular embodiment of the present invention, the inorganic microparticles include one or more microparticles selected from fumed silica, precipitated silica, and colloidal silica.

In an embodiment of the present invention, the particle size of the inorganic microparticle is at least 1 nm, in some cases at least 5 nm, in other cases at least 10 nm, in some situations at least 50 nm and in other situations at least 1 μm. The particle size of the inorganic microparticles is large enough to provide an enhancement of the rheology of solutions/dispersions of the present water-in-oil emulsion composition. Also, the particle size of the inorganic microparticles can be up to 100 μm, in some cases up to 50 μm, in other cases up to 10 μm, in some situations up to 5 μm and in other situations up to 1 μm. The particle size of the inorganic microparticle is not so large as to cause it to settle out of the present water-in-oil emulsion composition and any separation that does occur is reversible by means of mixing, shaking or stirring the waterin-oil emulsion composition. The particle size of the inorganic microparticle can vary between any of the values recited above.

As used herein, "rheology" refers to the deformation and flow properties of fluids and liquids to include shear-strain relationships and viscosity. Particular rheological characteristics include, but are not limited to, the shear response of a fluid or liquid, viscoelasticity, pseudoplasticity, thixotropy, and hysteresis properties as a result of stress, strain and shear history applied to the fluid or liquid.

In an embodiment of the present invention, the surface area of the inorganic microparticle is at least 1 $m^2/g$, in some cases at least at least 25 $m^2/g$, in other cases at least at least 50 $m^2/g$, in some situations at least at least 75 $m^2/g$ and in other situations at least at least 100 $m^2/g$. The surface area of the inorganic microparticles is large enough to provide an interaction between the microparticles and the polymer molecules of the present water-in-oil emulsion composition. Also, the surface area of the inorganic microparticles can be up to 1,000 $m^2/g$, in some cases up to 500 $m^2/g$, in other cases up to 400 $m^2/g$, in some situations up to 300 $m^2/g$ and in other situations up to 250 $m^2/g$. The surface area of the inorganic microparticle is not so large as to cause gelation of the present water-in-oil emulsion composition. The surface area of the microparticles is determined using BET nitrogen absorption as is known in the art. The surface area of the inorganic microparticle can vary between any of the values recited above.

In an embodiment of the invention, the inorganic microparticles make up at least 0.1%, in some cases at least 0.2%, in other cases at least 0.3% and in some situations at least 0.5% by weight of the water-in-oil emulsion composition. The amount of inorganic microparticles is sufficient to provide an enhancement of the viscosity of solutions/dispersions of the present water-in-oil emulsion composition. Also, the inorganic microparticles are present at up to 10%, in some cases up to 7.5%, in other cases up to 5%, in some situations up to 4% and in other situations up to 3% by weight of the water-in-oil emulsion composition. The amount of microparticles in the present water-in-oil emulsion composition is not so high as to cause instability or gelation of the water-in-oil emulsion composition. The amount of inorganic microparticles in the water-in-oil emulsion composition can vary between any of the values recited above.

In an embodiment of the present invention, the inorganic microparticle is mixed, dissolved and/or dispersed in a suitable carrier solvent and then added to the water-in-oil emulsion polymer. Thus, the carrier solvent can be part of the final water-in-oil emulsion composition. Suitable carrier solvents include, but are not limited to, mineral oil, synthetic oil, modified oil, paraffinic oil, vegetable oil, ethylene carbonate, propylene carbonate, glycols, polyglycols, glycol ethers, and mixtures thereof.

In a particular embodiment of the invention, the carrier solvent can include water. The amount of water that can be included in the carrier solvent is an amount that, when the carrier solvent/microparticle mixture is added to the water-in-oil emulsion composition, does not cause the water-in-oil emulsion composition to invert. As used herein, the term "invert" refers to those situations where the water-in-oil emulsion is destabilized and the oil phase becomes the dispersed phase and the aqueous phase becomes the continuous phase and/or the polymer microgels congeal and/or form a pituitous mass. When water is added to the carrier solvent, it can be included at a level of at least 0.5%, in some cases at least 1%, in other cases at least 5%, in some situations at least 7.5% and in other situations at least 10% by weight of the carrier solvent mixture. Also, water can be included in the carrier solvent at up to 50%, in some cases up to 40%, in other cases up to 30% and in some situations up to 25% by weight of the carrier solvent mixture. The amount of water that can be added will depend on the amount and type of microparticle employed, as well as the components in the water-in-oil emulsion polymer. The amount of water in the carrier solvent can be any value recited above and range between any set of values recited above.

In an embodiment of the present invention, the carrier solvent is a solvent characterized as having Hansen Solubility parameters at 25° C. of:

$\delta_d$ of from 13 to 18, in some cases 12 to 17, and in other cases 13 to 16;

$\delta_p$ of from 6 to 12, in some cases 7 to 11, and in other cases 8 to 10;

$\delta_h$ of at least 20, in some cases 10 to 20, and in other cases 12 to 18; and $\delta_t$ of at least 20, in some cases 10 to 20, and in other cases 12 to 18.

The specific Hansen Solubility parameters for the carrier solvent can vary between any of the values recited above.

In an embodiment of the invention, the carrier solvent makes up at least 0.5%, in some cases at least 0.75%, in other cases at least 1% and in some situations at least 2% by weight of the water-in-oil emulsion composition. The amount of carrier solvent is sufficient to admix the microparticles into the water-in-oil emulsion composition such that it remains stable. Also, the carrier solvent is present at up to 90%, in some cases up to 75%, in other cases up to 50%, in some situations up to 40% and in other situations up to 30% by weight of the water-in-oil emulsion composition. The amount of carrier in the present water-in-oil emulsion composition is not so high as to cause instability of the water-in-oil emulsion composition. The amount of carrier solvent in the water-in-oil emulsion composition can vary between any of the values recited above. As an additional benefit, the carrier solvent helps to prevent freezing in the water-in-oil emulsion composition.

In an embodiment of the present invention, an optional suitable fluidizing agent is added to the water-in-oil emulsion composition of the present invention so that the emulsion has desired flow properties, such as a desired viscosity. Suitable fluidizing agents include, but are not limited to, mineral spirits, diesel, turpentine, hydrotreated naptha, Stoddard solvent, kerosene, and mixtures thereof.

In an embodiment of the present invention, when the fluidizing agent is present, the fluidizing agent makes up at least 0.1%, in some cases at least 1%, in other cases at least 2.5% and in some situations at least 5% by weight of the water-in-oil emulsion composition. The amount of fluidizing agent is sufficient to adjust the flow properties of the water-in-oil emulsion composition such that it remains stable. Also, the fluidizing agent is present at up to 90%, in some cases up to 75%, in other cases up to 50%, in some situations up to 40% and in other situations up to 30% by weight of the water-in-oil emulsion composition. The amount of fluidizing agent in the present water-in-oil emulsion composition is not so high as to cause instability of the water-in-oil emulsion composition. The amount of fluidizing agent in the water-in-oil emulsion composition can vary between any of the values recited above. As an additional benefit, the fluidizing agent helps to prevent freezing in the water-in-oil emulsion composition.

Embodiments of the present invention are also directed to a fracturing fluid that includes a mixture provided by adding the above-described water-in-oil emulsion composition to water. Further to this embodiment, the fracturing fluid can additionally include proppant materials.

An advantage of the present invention is that it allows for the predictable, convenient and efficient preparation of fracturing fluids because the multicomponent polymer and microparticle composition is easily metered into the fluid.

In an embodiment of the invention, the water-in-oil emulsion composition makes up at least 0.01%, in some instances at least 0.05%, in some cases at least 0.1%, in other cases at least 0.25%, in some situations at least 0.5% and in other situations at least 1% by weight of the fracturing fluid. Additionally, the water-in-oil emulsion composition can be up to 20%, in some cases up to 15%, in other cases up to 10%, in some situations up to 7% and in other situations up to 5% by weight of the fracturing fluid. The amount of water-in-oil composition used is an amount sufficient to provide desired physical properties. The amount of water-in-oil emulsion can vary in a range between any of the values recited above.

In a further embodiment of the present invention, the emulsion polymer composition is "made down" in a polymer activation system or mix tank as part of the preparation of the inventive fracturing fluid. Typically, a mixing chamber, centrifugal pump and/or eductor is used to initially mix and dilute the feed polymer (in the prior art, the polymer could be in dry, concentrated solution, gel or emulsion form) into water. A predetermined amount of feed polymer is gradually fed into the mixing chamber or eductor, which is the initial feed polymer/water contact site for initial activation of the feed polymer. Once the feed polymer is fed into water, the polymer is allowed to "activate." As used herein, the terms "activate" and/or "activation" refer to a polymer in a dry or gel form transitioning to the bulk water phase, whereby the polymer changes from a tightly coiled structure to a more elongated, extended and relaxed structure.

For a dry polymer, initial activation requires more mixing energy and time because there is minimal water present in the polymer. In addition, the mixing energy required for activation increases with increasing particle size, due to reduced specific surface area. Activation is easier for solution polymers and gels than for dry polymers; however, the viscous nature of solution polymers and gels makes handling (e.g., pumping) of these polymers difficult. Polymers in emulsion form have a relatively low viscosity when compared to solution polymers, and, therefore, are easier to handle. Emulsion polymers also activate easier than dry polymers because of the small size of the polymer droplets or discrete gels. Another advantage of water-in-oil emulsion polymers is that they provide higher polymer concentration than solution polymers in liquid form.

In an embodiment of the present invention, any suitable proppant material may be used in the present fracturing fluid. Suitable proppant materials include, but are not limited to, resin coated or uncoated sand, Ottawa type sand (round), Brady type sand (angular), sintered bauxite, ceramic materials and glass beads.

Further description of suitable proppant materials, their use and concentrations thereof in the present fracturing fluid are described in Glidley et al., *Recent Advances in Hydraulic Fracturing*, Chapter 6, "Propping Agents and Fracture Conductivity", Society of Petroleum Engineers, Richardson, Tex., pp. 109-130.

In an embodiment of the invention, the fracturing fluid contains at least 0.1, in some cases at least 0.5, and in other cases at least 2 pounds of proppant material per gallon of fracturing fluid. Also, the fracturing fluid contains up to 10, in some cases up to 5, and in other cases up to 2 pounds of proppant material per gallon of fracturing fluid. The amount of proppant material can be any value or range between any of the values recited above.

In an embodiment of the present invention, the water used to make up the fracturing fluid can be selected from fresh water, unsaturated brine, and saturated brine.

In an additional embodiment of the invention, the fracturing fluid can also include an additive that is a pH adjusting compound selected from sodium hydroxide, potassium hydroxide, lithium hydroxide, ammonia, sodium carbonate, potassium carbonate, sodium bicarbonate, potassium bicarbonate, sodium diacetate, potassium diacetate, sodium phosphate, potassium phosphate, sodium dihydrogen phosphate, potassium dihydrogen phosphate, and mixtures thereof. These additives are present at a level sufficient to maintain a desired pH. The level of pH adjusting compound can be from 0.01% to 0.3%, in some cases 0.1% to 2.75% and in other cases 0.5% to 2.5% by weight based on the weight of the fracturing fluid.

Embodiments of the present invention further provide a method for making paper or paperboard. The method includes forming a cellulosic suspension, flocculating the suspension, draining the suspension on a machine fabric to form a sheet and drying the sheet. The cellulosic suspension is flocculated by the addition of the above-described water-in-oil emulsion composition.

The present water-in-oil emulsion composition can be added to the paper furnish at any convenient point prior to sheet formation. It will be appreciated by those skilled in the art that the exact points of addition are mill specific. Preferably, the composition of this invention is added to thin diluted aqueous cellulosic paper furnish. Any suitable method of addition known in the art can be utilized.

The amount of water-in-oil emulsion composition added to the papermaking furnish can be from 0.025 to 10, in some cases from 0.05 to 5 and in other cases from 0.1 to 3 kilograms of water-in-oil emulsion composition per ton of papermaking furnish. As used herein, "kilograms of water-in-oil emulsion composition per ton of papermaking furnish" means kilograms of actual water-in-oil emulsion composition per 1000 kilograms of solids present in the furnish. The abbreviation for kilograms of actual water-in-oil emulsion composition per 1000 kilograms of solids present in the furnish is "kg emulsion/ton."

In a particular embodiment of the invention, the water-in-oil emulsion composition is made down as described above and optionally allowed to activate prior to being added to the paper furnish.

Embodiments of the present invention further provide a method of dewatering sludge, where the sludge includes solids and water. The method includes adding the above-described water-in-oil emulsion composition to the sludge and physically separating the solids from the water.

The water-in-oil emulsion composition of the present invention may be used alone to separate solids and dewater sludge in water treatment operations. In an embodiment of the invention, the water-in-oil emulsion composition can be used with one or more coagulants. The most widely used coagulants are aluminum sulfate, aluminum chloride, ferric chloride, ferric sulfate, calcium oxide (lime), and magnesium oxide. Inorganic polymers of aluminum and iron that carry a positive charge are also widely used. The aluminum compounds are referred to as polyaluminum chloride and aluminum chlorohydrate when they are more fully neutralized. Organic coagulants can also be used and are typically based on cationic polymers that contain quaternary nitrogen chemistry, examples of such include, but are not limited to, poly (DADMAC) and polyamines.

In a particular embodiment of the invention, the water-in-oil emulsion composition is made down as described above and optionally allowed to activate prior to being added to the sludge.

The present invention will further be described by reference to the following examples. The following examples are merely illustrative of the invention and are not intended to be limiting. Unless otherwise indicated, all percentages are by weight.

EXAMPLES

Example 1

A water-in-oil emulsion composition useful in the present invention was prepared as follows. A first mixture was prepared by combining of 83.25 parts of a 35% active water-in-oil emulsion polymer available as KR-F2375 from Kroff Chemical Company, Inc., Pittsburgh, Pa. with 10 parts mineral spirits. A second mixture was prepared by dispersing fumed silica (BET surface Area ~200 m$^2$/g) in propylene glycol to form a 10 wt. % dispersion. The second mixture was then slowly added to the first mixture with stirring to form an approximately 36 wt. % total solids water-in-oil emulsion composition determined at 105° C. with a Model HR53 Moisture Balance available from Mettler-Toledo, Inc., Columbus, Ohio. The resulting water-in-oil emulsion composition did not gel or destabilize after standing for one month at ambient temperatures. The term "destabilize" refers to a congealed product or a product that otherwise does not retain it's original solution makedown characteristics.

Example 2

The following solutions were prepared by dissolving/dispersing the indicated thickener compositions in distilled water. The viscosity of the solutions was measured using a Model 35A Direct Reading Viscometer available from Fann Instrument Company, Houston, Tex., at 100, 200, 300 and 600 rpm and determining the viscosity as well as recording the reading at 511 sec$^{-1}$ (300 rpm). The results are shown in the table below.

| Polymer | Concentration (ppt[1]) | Fann Reading at 511 sec$^{-1}$ | Fann Viscosity |
|---|---|---|---|
| Super Gel 15[2] | 10 | 8.4 | 0.00448 |
| Super Gel 15[2] | 20 | 9.2 | 0.00269 |
| Super Gel 15[2] | 30 | 16.0 | 0.00657 |
| Super Gel 15[2] | 40 | 24.4 | 0.01865 |
| Super Gel 15[2] | 60 | 39.1 | 0.03055 |
| Super Gel 20[3] | 10 | 4.6 | 0.00034 |
| Super Gel 20[3] | 20 | 8.9 | 0.00334 |
| Super Gel 20[3] | 30 | 16.0 | 0.00657 |
| Super Gel 20[3] | 40 | 20.5 | 0.00756 |
| Super Gel 20[3] | 60 | 44.9 | 0.03805 |
| Cw-2k[4] | 10 | 8.1 | 0.00386 |
| Cw-2k[4] | 20 | 12.1 | 0.00598 |
| Cw-2k[4] | 30 | 17.1 | 0.00870 |
| Cw-2k[4] | 40 | 20.0 | 0.00729 |
| Cw-2k[4] | 60 | 28.9 | 0.01579 |
| Example 1 | 2.4 | 7.6 | 0.00190 |
| Example 1 | 7 | 14.9 | 0.00383 |
| Example 1 | 12 | 18.7 | 0.00969 |
| Example 1 | 17 | 20.2 | 0.01067 |
| Example 1 | 24 | 28.1 | 0.01177 |

[1] pounds per thousand gallons of water including active polymer and microparticle when used
[2] dry polyacrylamide available from Superior Well Services, Inc., Black Lick, PA.
[3] dry polyacrylamide available from Superior Well Services, Inc.
[4] dry polyacrylamide/silica blend available from Superior Well Services, Inc.

The data show the superior viscosity building properties of the water-in-oil emulsion composition of the present invention.

Example 3

This test evaluates the hydration of one composition versus another. The water-in-oil emulsion composition of Example 1 was added to 500 ml of distilled water with mixing. The Fann Viscosity of the solutions was measured over time. In fracturing operations, it is desirable that hydration takes place as fast as possible. The same controls were used as before. The percent hydration is the ratio of the measured viscosity to the ultimate viscosity. The results are shown in the table below.

| Polymer | pH | Time (min.) | 3 | 5 | 7 | 9 | 11 | 13 | 15 | 21 |
|---|---|---|---|---|---|---|---|---|---|---|
| Super Gel 15[2] 2.5 ppt | 6.0 | Viscosity | 12 | 15 | 17 | 17 | 18 | 18 | 19 | 18 |
| | | Hydration (%) | 63 | 79 | 89 | 89 | 95 | 95 | 100 | 95 |
| Super Gel 15[2] 4 ppt | 8.0 | Viscosity | 11 | 14 | 15 | 17 | 18 | 18 | 19 | 19 |
| | | Hydration(%) | 58 | 74 | 79 | 89 | 95 | 95 | 100 | 100 |
| Super Gel 20[3] 2.5 ppt | 6.0 | Viscosity | 14 | 16 | 17 | 18 | 18 | 18 | 18 | 19 |
| | | Hydration (%) | 70 | 80 | 85 | 90 | 90 | 90 | 90 | 95 |
| Super Gel 20[3] 4 ppt | 8.0 | Viscosity | 15 | 17 | 18 | 19 | 19 | 19 | 20 | 20 |
| | | Hydration(%) | 75 | 85 | 90 | 95 | 95 | 95 | 100 | 100 |
| Cw + 2k[4] 2.5 ppt | 6.0 | Viscosity | 5 | 7 | 9 | 10 | 11 | 12 | 12 | 12 |
| | | Hydration(%) | 31 | 44 | 56 | 63 | 39 | 75 | 75 | 75 |
| Cw + 2k[4] 4 ppt | 8.0 | Viscosity | 7 | 10 | 13 | 14 | 14 | 14 | 14 | 15 |
| | | Hydration(%) | 44 | 63 | 81 | 88 | 88 | 88 | 88 | 94 |
| Example 1 2.5 ppt | 6.0 | Viscosity | 12 | 13 | 13 | 14 | 14 | 15 | 15 | 15 |
| | | Hydration(%) | 80 | 87 | 87 | 93 | 93 | 100 | 100 | 100 |
| Example 1 4 ppt | 8.0 | Viscosity | 14 | 15 | 15 | 15 | 15 | 15 | 15 | 15 |
| | | Hydration(%) | 93 | 100 | 100 | 100 | 100 | 100 | 100 | 100 |

The data demonstrate the shorter hydration time of the water-in-oil emulsion composition of the present invention. Further, equivalent viscosities are obtained using less polymer.

Examples 4 and 5

The following examples illustrate the use of the emulsion of the invention in fracturing fluids by running two stimulations in the same gas field, the wells approximately 1400 feet apart in the upper Devonian geological strata. The first stimulation is based on a prior art treatment using dry partially hydrolyzed polyacrylamide (PHPA). The second stimulation is based on a treatment according to the invention. The treatments are summarized in the following table (MCF/day=1000 cubic feet per day).

|  | Example 4 | Example 5 |
| --- | --- | --- |
| Polymer | dry PHPA | Emulsion product of Example 1 |
| Polymer concentration | 6 lb./1,000 gal | 6 lb./1,000 gal |
| Propping Agent | 20/40 grade sand | 20/40 grade sand |
| Proppant amount | 1.33 (lb./gal. treatment) | 1.25 (lb./gal. treatment) |
| Well depth | 3,749 ft. | 3,854 ft. |
| Gas flow after treatment | 504 MCF/day | 1,500 MCF/day |
| Open gas flow after treatment | 9 CFD/lb. proppant | 12.24 CFD/lb. proppant |

The data demonstrate the superior performance, as evidenced by higher gas production, when the emulsion according to the present invention is used in treatments to fracture gas wells.

Examples 6 and 7

The following examples illustrate the use of the emulsion of the invention in fracturing fluids by running two stimulations in the same gas field, the wells approximately feet apart in the upper Devonian geological strata. The first stimulation is based on a prior art treatment using dry guar. The second stimulation is based on a treatment according to the invention. The treatments are summarized in the following table (MCF/day=1000 cubic feet per day).

|  | Example 4 | Example 5 |
| --- | --- | --- |
| Polymer | guar | Emulsion product of Example 1 |
| Polymer concentration | 10 lb./1,000 gal | 6 lb./1,000 gal |
| Propping Agent | 20/40 grade sand | 20/40 grade sand |
| Proppant amount | 1.47 (lb./gal. treatment) | 1.45 (lb./gal. treatment) |
| Well depth | 3,371 ft. | 3,700 ft. |
| Gas flow after treatment | 198 MCF/day | 1,007 MCF/day |
| Open gas flow after treatment | 2.83 CFD/lb. proppant | 7.24 CFD/lb. proppant |

The data demonstrate the superior performance, as evidenced by higher gas production, when the emulsion according to the present invention is used in treatments to fracture gas wells.

Example 8

A water-in-oil emulsion composition useful in the present invention was prepared as follows. A mixture was prepared by dispersing a fumed silica (BET surface area ~200 $m^2/g$) in propylene glycol to form a 10 wt. % dispersion. The mixture was then slowly added to 96.3 parts of an anionic water-in-oil emulsion polymer KR-F2375 from Kroff Chemical Company, Inc. (viscosity 1,380 cps, Brookfield Model DV-11+, 30 rpm, 23° C.). The resulting water-in-oil emulsion composition had a smooth consistency and a viscosity of 1,732 cps. The resulting water-in-oil emulsion composition did not gel or destabilize after standing for one month at ambient temperatures.

Example 9

A water-in-oil emulsion composition useful in the present invention was prepared as follows. A mixture was prepared by dispersing a fumed silica (BET surface area ~200 $m^2/g$) in propylene glycol to form a 10 wt. % dispersion. The mixture was then slowly added to 93.4 parts of an anionic water-in-oil emulsion polymer KR-F2375 from Kroff Chemical Company, Inc. (viscosity 1,380 cps, Brookfield Model DV-11+, 30 rpm, 23° C.). The resulting water-in-oil emulsion composition had a smooth consistency and a viscosity of 1,940 cps. The resulting water-in-oil emulsion composition did not gel or destabilize after standing for one month at ambient temperatures.

Example 10

A water-in-oil emulsion composition useful in the present invention was prepared as follows. A mixture was prepared by dispersing a fumed silica (BET surface area ~200 $m^2/g$) in propylene glycol to form a 10 wt. % dispersion. The mixture was then slowly added to 90.7 parts of an anionic water-in-oil emulsion polymer KR-F2375 from Kroff Chemical Company, Inc. (viscosity 1,380 cps, Brookfield Model DV-11+, 30 rpm, 23° C.). The resulting water-in-oil emulsion composition had a smooth consistency and a viscosity of 2,540 cps. The resulting water-in-oil emulsion composition did not gel or destabilize after standing for one month at ambient temperatures.

Example 11

A water-in-oil emulsion composition useful in the present invention was prepared as follows. A mixture was prepared by dispersing a fumed silica (BET surface area ~200 m²/g) in propylene glycol to form a 10 wt. % dispersion. The mixture was then slowly added to 88.1 parts of an anionic water-in-oil emulsion polymer KR-F2375 from Kroff Chemical Company, Inc. (viscosity 1,380 cps, Brookfield Model DV-11+, 30 rpm, 23° C.). The resulting water-in-oil emulsion composition had a smooth consistency and a viscosity of 8,520 cps. The resulting water-in-oil emulsion composition did not gel or destabilize after standing for one month at ambient temperatures.

Example 12

A water-in-oil emulsion composition useful in the present invention was prepared as follows. A mixture was prepared by dispersing a precipitated silica (Tixosil® 38 AB, Rhodia, Cranberry, N.J.) in mineral oil to form a 10 wt. % dispersion. The mixture was then slowly added to 73.0 parts of an anionic water-in-oil emulsion polymer KR-F3230 from Kroff Chemical Company, Inc. (viscosity 405 cps, Brookfield Model DV-11+, 30 rpm, 23° C.). The resulting water-in-oil emulsion composition had a smooth consistency and a viscosity of 340 cps. The resulting water-in-oil emulsion composition did not gel or destabilize after standing for one month at ambient temperatures.

Example 13

A water-in-oil emulsion composition useful in the present invention was prepared as follows. A mixture was prepared by dispersing a precipitated silica (Tixosil® 38 AB, Rhodia, Cranberry, N.J.) in mineral oil to form a 10 wt. % dispersion. The mixture was then slowly added to 80.9 parts of a cationic water-in-oil emulsion polymer KR-F5010 from Kroff Chemical Company, Inc. (viscosity 550 cps, Brookfield Model DV-11+, 30 rpm, 23° C.). 5.7 parts of an odorless mineral spirits was slowly added to the water-in-oil emulsion composition. The resulting water-in-oil emulsion composition had a smooth consistency and a viscosity of 245 cps. The resulting water-in-oil emulsion composition did not gel or destabilize after standing for one month at ambient temperatures.

Example 14

A water-in-oil emulsion composition useful in the present invention was prepared as follows. A first mixture was prepared by combining of 76 parts of a cationic water-in-oil emulsion polymer KR-F5516 from Kroff Chemical Company with 9.5 parts mineral spirits. The mixture had a viscosity of 1,150 cps (viscosity 1,380 cps, Brookfield Model DV-11+, 30 rpm, 23° C.). A second mixture was prepared by dispersing a precipitated silica (Tixosil® 68, Rhodia, Cranberry, N.J.) in propylene glycol to form a 7.5 wt. % dispersion. The second mixture (14.5 parts) was then slowly added to the first mixture (85.5 parts) with mixing to form a water-in-oil emulsion composition, which had a smooth consistency and a viscosity of 344 cps. The resulting water-in-oil emulsion composition did not gel or destabilize after standing for one month at ambient temperatures.

Example 15

This example explains using the present water-in-oil emulsion composition to treat sludge. A jar test is performed utilizing an electrical variable speed beaker stir system, 500 ppm (on an active basis) of the water-in-oil emulsion composition of Example 14 is added to 500 ml of a sludge from a thermophilic digestion system. The percentage of solids in the sludge is about 4.4 percent. The beaker is allowed to stir at 120 rpm for 30 seconds. At 30 seconds, the speed is reduced to 90 rpm and after 15 seconds, the stir speed was slowed to 30 rpm and mixed for another 30 seconds. Large, heavy floc (e.g. with a diameter of at least about 4 mm) is formed with a somewhat cloudy supernatant.

Example 16

This example explains using the present water-in-oil emulsion composition in papermaking. Drainage/Retention performance values are obtained using the Schopper-Reigler Freeness Test. The paper stock furnish is a 50:50 w/w blend of hardwood and softwood pulps which contains 13 wt. % clay, 2 wt. % $TiO_2$, 2 wt. % alum and 1 wt. % rosin. The water-in-oil emulsion composition of Example 13 is added at 0.5 lb/ton on an active basis. Drainage and retention are improved compared to a control with an equivalent emulsion polymer that does not contain microparticles added to the paper stock furnish.

The present invention has been described with reference to specific details of particular embodiments thereof. It is not intended that such details be regarded as limitations upon the scope of the invention except insofar as and to the extent that they are included in the accompanying claims.

I claim:

1. A water-in-oil emulsion composition comprising:
    (a) 5% to 99% by weight of a water-in-oil emulsion comprising:
        (i) 10% to 90% by weight of a hydrophobic oil phase;
        (ii) 0.5% to 10% by weight of a surfactant system; and
        (iii) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
    (b) 0.1% to 10% by weight of one or more inorganic microparticles;
    (c) 0.5% to 90% by weight of a carrier solvent; and
    (d) 0 to 90% by weight of a fluidizing agent,
wherein each of the above weight percentages is based upon the total weight of the composition.

2. The composition of claim 1, wherein the oil phase comprises one or more oils selected from the group consisting of mineral oil, synthetic oil, modified oil, paraffinic oil, benzene, xylene, toluene, mineral oils, kerosene, naphthas, petroleums, blends of aromatic and aliphatic hydrocarbons containing 4 or greater carbon atoms, and vegetable oil.

3. The composition of claim 1, wherein the surfactant system comprises one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylates with 1 to 30 oxypropylene units, $C_6$-$C_{22}$ linear or branched alkyl ethoxylates/propoxylates with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, and ethylene oxide condensates of fatty acid amides.

4. The composition of claim 1, wherein the polymer or copolymer of the aqueous phase is selected from non-ionic poly(acrylamide) homopolymer, non-ionic copolymers, anionic copolymers, cationic copolymers, amphoteric copolymers and ampholytic copolymers.

5. The composition of claim 1, wherein the repeat units from an acrylamide monomer comprise one or more repeat units according to Formula I:

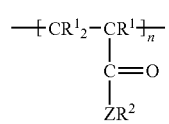

wherein each occurrence of $R^1$ is independently selected from H, methyl and ethyl; n is an integer from 10 to 10,000,000; Z is $-NR^2-$; and each occurrence of $R^2$ is independently selected from the group consisting of H, $C_1$-$C_{22}$ linear, branched or cyclic alkyl, aryl, alkaryl, aralkyl or alkenyl, a group $-R^3-NR^2_2$, a group $-R^3-N^+R^2_3$ X, and a group $-R^3-SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

6. The composition of claim 1, wherein the copolymer of the aqueous phase further comprises repeat units derived from acrylamidopropyl trimethyl ammonium chloride (APTAC), methacrylamidopropyltrimethyl ammonium chloride (MAPTAC), methacryloyloxyethyl trimethyl ammonium chloride (METAC) methacryloyloxyethyl trimethyl ammonium methylsulfate (METAMS), acryloyloxyethyl trimethyl ammonium chloride (AETAC), dimethyl diallyl ammonium chloride (DMDAAC), acrylic acid (AA), methacrylic acid (MAA), 2-acrylamido-2-methylpropane sulfonic acid (AMPSA), 2-methacrylamido-2-methylpropane sulfonic acid (MAMPSA), $C_1$-$C_3$ alkyl acrylate, $C_1$-$C_3$ alkyl methacrylate, n-alkyl acrylamide, methacrylamide, n-alkyl-methacrylamide, and diacetone acrylamide.

7. The composition of claim 1, wherein the polymer or copolymer of the aqueous phase has a reduced viscosity, measured using a Ubbelohde Capillary Viscometer at 0.05 g/dl in 1N NaCl at 30° C. and pH of 7 of from 5 to 50 dl/g.

8. The composition of claim 1, wherein the inorganic microparticles include one or more microparticles selected from the group consisting of fumed silica, precipitated silica, colloidal silica, alumina silicates, treated silica, calcium carbonate, silica flour, diatomites, talc, and borosilicates.

9. The composition of claim 1, wherein the inorganic microparticles have an average particle size of less than 100 μm.

10. The composition of claim 1, wherein the inorganic microparticles include one or more microparticles selected from the group consisting of fumed silica, precipitated silica, and colloidal silica.

11. The composition of claim 1, wherein the carrier solvent is one or more selected from the group consisting of mineral oil, synthetic oil, modified oil, paraffinic oil, vegetable oil, ethylene carbonate, propylene carbonate, glycols, polyglycols and glycol ethers.

12. The composition of claim 1, wherein the carrier solvent is a solvent characterized as having Hansen Solubility parameters at 25° C. of:
   $\delta_d$ of from 13 to 18;
   $\delta_p$ of from 6 to 12;
   $\delta_h$ of at least 20; and
   $\delta_t$ of at least 20.

13. The composition of claim 1, wherein the fluidizing agent is selected from the group consisting of mineral spirits, diesel, turpentine, hydrotreated naphtha, Stoddard solvent and kerosene.

14. A water-in-oil emulsion composition comprising:
   (a) 5% to 99% by weight of a water-in-oil emulsion comprising:
      (1) 10% to 90% by weight of a hydrophobic oil phase;
      (2) 0.5% to 10% by weight of a surfactant system; and
      (3) 5% to 90% by weight of a polymer-containing aqueous phase comprising water and the polymer or copolymer containing repeat units from an acrylamide monomer, wherein the polymer or copolymer comprises from 2% by weight to 89.5% by weight of the water-in-oil emulsion,
      wherein each of the weight percentages (1)-(3) is based upon total weight of the water-in-oil emulsion;
   (b) 0.1% to 5% by weight of one or more inorganic microparticles selected from the group consisting of fumed silica, precipitated silica, colloidal silica, alumina silicates, treated silica, calcium carbonate, talc, and borosilicates;
   (c) 0.5% to 90% by weight of a carrier solvent selected from the group consisting of mineral oil, synthetic oil, modified oil, paraffinic oil, vegetable oil, ethylene glycol, propylene glycol, ethylene carbonate, propylene carbonate glycol ethers and mixtures thereof; and
   (d) 0 to 90% by weight of a fluidizing agent,
wherein each of the above weight percentages of (a)-(d) is based upon the total weight of the composition.

15. The composition of claim 14, wherein the surfactant system comprises of one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylate with 1 to 30 oxypropylene units, $C_6$-$C_{22}$ linear or branched alkyl ethoxylate/propoxylate with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, and ethylene oxide condensates of fatty acid amides.

16. The composition of claim 14, wherein the polymer or copolymer of the aqueous phase is selected from non-ionic poly(acrylamide) homopolymer, non-ionic copolymers, anionic copolymers, cationic copolymers, amphoteric copolymers and ampholytic copolymers.

17. The composition of claim 14, wherein the repeat units from an acrylamide monomer comprise one or more repeat units according to Formula I:

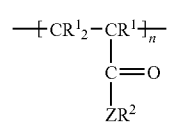

wherein each occurrence of $R^1$ is independently selected from H, methyl and ethyl; n is an integer from 10 to 10,000,000; Z is $-NR^2-$; and each occurrence of $R^2$ is independently selected from the group consisting of H, $C_1$-$C_{22}$ linear, branched or cyclic alkyl, aryl, alkaryl, aralkyl or alkenyl, a group $-R^3-NR^2_2$, a group $-R^3-N^+R^2_3$ X, and a group $-R^3-SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

18. The composition of claim 14, wherein the oil phase comprises one or more oils selected from the group consisting of mineral oil, synthetic oil, modified oil, paraffinic oil, benzene, xylene, toluene, mineral oils, kerosene, naphthas, petroleums, blends of aromatic and aliphatic hydrocarbons containing 4 or greater carbon atoms, and vegetable oil.

19. The composition of claim 14, wherein the polymer or copolymer of the aqueous phase is selected from non-ionic poly(acrylamide) homopolymer, non-ionic copolymers, anionic copolymers, cationic copolymers, amphoteric copolymers and ampholytic copolymers.

20. The composition of claim 14, wherein the copolymer of the aqueous phase further comprises repeat units derived from acrylamidopropyltrimethyl ammonium chloride (APTAC), methacrylamidopropyltrimethyl ammonium chloride (MAPTAC), methacryloyloxyethyl trimethyl ammonium chloride (METAC) methacryloyloxyethyl trimethyl ammonium methylsulfate (METAMS), acryloyloxyethyl trimethyl ammonium chloride (AETAC), dimethyl diallyl ammonium chloride (DMDAAC), acrylic acid (AA), methacrylic acid (MAA), 2-acrylamido-2-methylpropane sulfonic acid (AMPSA), 2-methacrylamido-2-methylpropane sulfonic acid (MAMPSA), $C_1$-$C_3$ alkyl acrylate, $C_1$-$C_3$ alkyl methacrylate, n-alkyl acrylamide, methacrylamide, n-alkylmethacrylamide, and diacetone acrylamide.

21. The composition of claim 14, wherein the polymer or copolymer of the aqueous phase has a reduced viscosity, measured using a Ubbelohde Capillary Viscometer at 0.05 g/dl in 1N NaCl at 30° C. and pH of 7 of from 5 to 50 dl/g.

22. The composition of claim 14, wherein the inorganic microparticles include one or more microparticles selected from the group consisting of fumed silica, precipitated silica, and colloidal silica.

23. The composition of claim 14, wherein the inorganic microparticles have an average particle size of less than 100 μm.

24. The composition of claim 14, wherein the carrier solvent is a solvent characterized as having Hansen Solubility parameters at 25° C. of:
$\delta_d$ of from 13 to 18;
$\delta_p$ of from 6 to 12;
$\delta_h$ of at least 20; and
$\delta_t$ of at least 20.

25. A water-in-oil emulsion composition comprising:
(a) 5% to 99% by weight of a water-in-oil emulsion comprising:
  (1) 10% to 90% by weight of a hydrophobic oil phase consisting essentially of one or more oils selected from the group consisting of mineral oil, synthetic oil, modified oil, paraffinic oil, and vegetable oil;
  (2) 0.5% to 10% by weight of a surfactant system consisting essentially of one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylate with 1 to 30 oxypropylene units, $C_6$-$C_{22}$ linear or branched alkyl ethoxylate/propoxylate with 1 to 30 combined oxyethylene and oxypropylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, and ethylene oxide condensates of fatty acid amides; and
  (3) 5% to 90% by weight of a polymer-containing aqueous phase consisting essentially of water, catalyst and initiator residues, optionally salts, and polymers consisting essentially of repeat units from one or more repeat units according to Formula I:

$$-\!\!\!+\!\!\operatorname{CR}^1_2-\operatorname{CR}^1\!\!+\!\!\!\!-_n$$
$$\phantom{-\!\!\!+\!\!\operatorname{CR}^1_2-}\overset{|}{\underset{|}{\operatorname{C}}}\!\!=\!\!\operatorname{O}$$
$$\phantom{-\!\!\!+\!\!\operatorname{CR}^1_2-}\operatorname{ZR}^2$$

(I)

wherein each occurrence of $R^1$ is independently selected from H, methyl and ethyl; n is an integer from 10 to 10,000,000; Z is —$NR^2$—; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2_2$, a group —$R^3$—$N^+R^2_3X$, and a group —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polymer consisting essentially of repeat units from one or more repeat units according to Formula I comprises from 2% by weight to 89.5% by weight of the water-in-oil emulsion, and wherein each of the weight percentages (1)-(3) is based upon total weight of the water-in-oil emulsion;

(b) 0.1% to 10% by weight of one or more inorganic microparticles selected from the group consisting of fumed silica, precipitated silica, colloidal silica, alumina silicates, treated silica, calcium carbonate, talc, and borosilicates;

(c) 0.5% to 90% by weight of a carrier solvent, wherein the carrier solvent is a solvent characterized as having Hansen Solubility parameters at 25° C. of:
$\delta_d$ of from 13 to 18;
$\delta_p$ of from 6 to 12;
$\delta_h$ of at least 20; and
$\delta_t$ of at least 20; and (d) 0 to 90% by weight of a fluidizing agent, wherein each of the above weight percentages of (a)-(d) is based upon the total weight of the composition.

26. The composition of claim 25, wherein the polymer or copolymer of the aqueous phase has a reduced viscosity, measured using a Ubbelohde Capillary Viscometer at 0.05 g/dl in 1N NaCl at 30° C. and pH of 7 of from 5 to 50 dl/g.

27. The composition of claim 25, wherein the inorganic microparticles include one or more microparticles selected from the group consisting of fumed silica, precipitated silica, and colloidal silica.

28. The composition of claim 1, wherein the polymer or copolymer containing repeat units from an acrylamide monomer further comprises one or more repeat units according to Formula I:

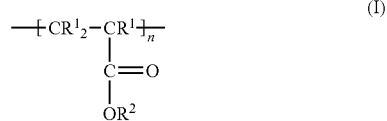

wherein each occurrence of $R^1$ is independently selected from H, methyl and ethyl; n is an integer from 10 to 10,000,000; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2{}_2$, a group —$R^3$—$N^+R^2{}_3$ X, and a group —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

29. The composition of claim 14, wherein the polymer or copolymer containing repeat units from an acrylamide monomer further comprises one or more repeat units according to Formula I:

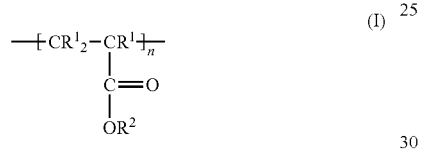

wherein each occurrence of $R^1$ is independently selected from H, methyl and ethyl; n is an integer from 10 to 10,000,000; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2{}_2$, a group —$R^3$—$N^+R^2{}_3$ X, and a group —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

30. A fracturing fluid comprising the mixture provided by adding a water-in-oil emulsion composition to water, wherein the water-in-oil emulsion composition comprises:
  (i) 5% to 99% by weight of a water-in-oil emulsion comprising
    (i) 10% to 90% by weight of a hydrophobic oil phase;
    (ii) 0.5% to 10% by weight of a surfactant system; and
    (iii) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
  (ii) 0.1% to 10% by weight of one or more inorganic microparticles;
  (iii) 0.5% to 90% by weight of a carrier solvent; and
  (iv) 0 to 90% by weight of a fluidizing agent,
wherein each of the above weight percentages is based upon the total weight of the composition.

31. The fracturing fluid of claim 30, further comprising (v) 0.5% to 50% by weight of a proppant material.

32. The fracturing fluid of claim 30, wherein the oil phase comprises one or more oils selected from the group consisting of mineral oil, synthetic oil, modified oil, paraffinic oil, benzene, xylene, toluene, mineral oils, kerosene, naphthas, petroleums, blends of aromatic and aliphatic hydrocarbons containing 4 or greater carbon atoms, and vegetable oil.

33. The fracturing fluid of claim 30, wherein the surfactant system comprises of one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylate with 1 to 30 oxypropylene units, $C_6$-$C_{22}$ linear or branched alkyl ethoxylate/propoxylate with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, and ethylene oxide condensates of fatty acid amides.

34. The fracturing fluid of claim 30, wherein the polymer or copolymer of the aqueous phase is selected from non-ionic poly(acrylamide) homopolymer, non-ionic copolymers, anionic copolymers, cationic copolymers, amphoteric copolymers and ampholytic copolymers.

35. The fracturing fluid of claim 30, wherein the repeat units from the acrylamide monomer comprise one or more repeat units according to Formula I:

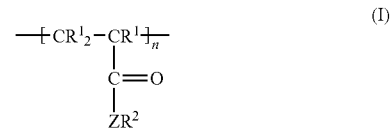

wherein each occurrence of $R^1$ is independently selected from H, methyl and ethyl, n is an integer from 10 to 10,000,000, Z is —$NR^2$—, and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2{}_2$, a group —$R^3$—$N^+R^2{}_3$ X, and a group —$R^3$—$SO_3Y$, wherein $R^2$ is as previously defined, $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide), Y is H or an alkali metal ion, and X is a halide or methylsulfate.

36. The fracturing fluid of claim 30, wherein the copolymer of the aqueous phase further comprises repeat units derived from acrylamidopropyltrimethyl ammonium chloride (APTAC), methacrylamidopropyltrimethyl ammonium chloride (MAPTAC), methacryloyloxyethyl trimethyl ammonium chloride (METAC) methacryloyloxyethyl trimethyl ammonium methylsulfate (METAMS), acryloyloxyethyl trimethyl ammonium chloride (AETAC), dimethyl diallyl ammonium chloride (DMDAAC), acrylic acid (AA), methacrylic acid (MAA), 2-acrylamido-2-methylpropane sulfonic acid (AMPSA), 2-methacrylamido-2-methylpropane sulfonic acid (MAMPSA), $C_1$-$C_3$ alkyl acrylate, $C_1$-$C_3$ alkyl methacrylate, n-alkyl acrylamide, methacrylamide, n-alkylmethacrylamide, and diacetone acrylamide.

37. The fracturing fluid of claim 30, wherein the polymer or copolymer of the aqueous phase has a reduced viscosity, measured using a Ubbelohde Capillary Viscometer at 0.05 g/dl in 1N NaCl at 30° C. and pH of 7 of from 5 to 50 dl/g.

38. The fracturing fluid of claim 30, wherein the inorganic microparticles (ii) include one or more microparticles selected from the group consisting of fumed silica, precipitated silica, colloidal silica, alumina silicates, treated silica, calcium carbonate, talc, and borosilicates.

39. The fracturing fluid of claim 30, wherein the inorganic microparticles (ii) include one or more microparticles selected from the group consisting of fumed silica, precipitated silica, and colloidal silica.

40. The fracturing fluid of claim 30, wherein the carrier solvent (iii) is one or more selected from the group consisting of mineral oil, synthetic oil, modified oil, paraffinic oil, vegetable oil, ethylene glycol, propylene glycol, ethylene carbonate, propylene carbonate and glycol ethers.

41. The fracturing fluid of claim 30, wherein the carrier solvent (iii) is a solvent characterized as having Hansen Solubility parameters at 25° C. of:
$\delta_d$ of from 13 to 18;
$\delta_p$ of from 6 to 12;
$\delta_h$ of at least 20; and
$\delta_t$ of at least 20.

42. The fracturing fluid of claim 30, wherein the water is selected from the group consisting of fresh water, unsaturated brine and saturated brine.

43. The fracturing fluid of claim 30, further comprising one or more polymers selected from the group consisting of hydroxypropylguar, carboxymethylhydroxypropylguar, carboxymethylguar, hydroxyethyl cellulose, grafted hydroxyethyl cellulose, carboxymethyl cellulose and carboxymethylhydroxyethyl cellulose.

44. The fracturing fluid of claim 30, wherein the water-in-oil emulsion composition substantially is present in the treating fluid in an amount in the range of from about 0.01% to about 10% by weight of the fracturing fluid.

45. The fracturing fluid of claim 30, further comprising 0.01% to 0.3% by weight of a pH adjusting compound for elevating the pH of the treating fluid selected from the group consisting of sodium hydroxide, potassium hydroxide, lithium hydroxide sodium carbonate, potassium carbonate, sodium bicarbonate, potassium bicarbonate, sodium diacetate, potassium diacetate, sodium phosphate, potassium phosphate, sodium dihydrogen phosphate and potassium dihydrogen phosphate.

46. The fracturing fluid of claim 30, further comprising from 0.01% to 0.3 percent by weight of a buffer selected from the group consisting of sodium carbonate, potassium carbonate, sodium bicarbonate, potassium bicarbonate, sodium diacetate, potassium diacetate, sodium phosphate, potassium phosphate, sodium dihydrogen phosphate and potassium dihydrogen phosphate.

47. The fracturing fluid of claim 30, further comprising from 0.01% to 0.1% by weight of a surfactant selected from the group consisting of $C_2$-$C_{24}$ linear, branched and cyclic alkyl phenol ethoxylates, $C_2$-$C_{24}$ linear, branched and cyclic alkyl ethoxylates, alkyl sulfonates, alkyl aryl sulfonates such as the salts of dodecylbenzene sulfonic acid, alkyltrimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols and trialkyl benzylammonium chloride.

48. The fracturing fluid of claim 30, further comprising from 0.1% to 10% by weight of a clay stabilizer selected from the group consisting of potassium chloride, sodium chloride, ammonium chloride, tetramethyl ammonium chloride and temporary clay stabilizers.

49. The fracturing fluid of claim 30, further comprising from 0.01% to 1% by weight of a fluid loss control agent selected from the group consisting of silica flour, starches, waxes and resins.

50. The fracturing fluid of claim 30, further comprising from 0.01 to 2 percent by weight of a delayed breaker for causing the treating fluid to revert to a thin fluid selected from the group of oxidizers, encapsulated oxidizers and enzyme breakers consisting of sodium persulfate, potassium persulfate, ammonium persulfate, magnesium peroxide, sodium chlorite, sodium bromate, alpha and beta amylases, amyloglucosidase, invertase, maltase, cellulose, halogenated isocyanurate, hypochlorites, and hemicellulase.

51. The fracturing fluid of claim 30, wherein the proppant material is selected from the group consisting of resin coated or uncoated sand, sintered bauxite, ceramic materials and glass beads.

52. The fracturing fluid of claim 30, wherein the proppant material is present in the treating fluid in an amount in the range of from about 1 to about 30 pounds of proppant material per gallon of the fracturing fluid.

53. The fracturing fluid of claim 30, wherein the polymer or copolymer containing repeat units from an acrylamide monomer further comprises one or more repeat units according to Formula I:

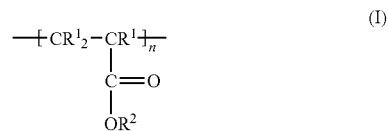

wherein each occurrence of $R^1$ is independently selected from H, methyl and ethyl; n is an integer from 10 to 10,000,000; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2_2$, a group —$R^3$—$N^+R^2_3$ X, and a group —$R^3$—$SO_3$Y, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

54. A method for making paper or paper board comprising:
forming a cellulosic suspension;
flocculating the suspension;
draining the suspension on a screen to form a sheet; and
drying the sheet;
wherein the cellulosic suspension is flocculated by the addition of a water-in-oil emulsion composition comprising:
(a) 5% to 99% by weight of a water-in-oil emulsion polymer comprising:
(i) 10% to 90% by weight of a hydrophobic oil phase;
(ii) 0.5% to 10% by weight of a surfactant system; and
(iii) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
(b) 0.1% to 10% by weight of one or more inorganic microparticles;
(c) 0.5% to 90% by weight of a carrier solvent; and
(d) 0 to 90% by weight of a fluidizing agent.

55. The method of claim 54, wherein the oil phase comprises one or more oils selected from the group consisting of mineral oil, synthetic oil, modified oil, paraffinic oil, benzene, xylene, toluene, mineral oils, kerosene, naphthas, petroleums, blends of aromatic and aliphatic hydrocarbons containing 4 or greater carbon atoms, and vegetable oil.

56. The method claim 54, wherein the surfactant system comprises one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylates with 1 to 30 oxypropylene units, $C_6$-$C_{22}$ linear or branched alkyl ethoxylates/propoxylates with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, and ethylene oxide condensates of fatty acid amides.

57. The method of claim 54, wherein the repeat units from an acrylamide monomer comprise one or more repeat units according to Formula I:

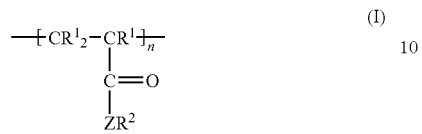

wherein each occurrence of $R^1$ is independently selected from H, methyl and ethyl; n is an integer from 10 to 10,000,000; Z is $-NR^2-$; and each occurrence of $R^2$ is independently selected from the group consisting of H, $C_1$-$C_{22}$ linear, branched or cyclic alkyl, aryl, alkaryl, aralkyl or alkenyl, a group $-R^3-NR^2{}_2$, a group $-R^3-N^+R^2{}_3 X$, and a group $-R^3-SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

58. A method of dewatering sludge, wherein the sludge comprises solids and water, comprising the steps of:
   adding a water-in-oil emulsion composition to the sludge; and
   physically separating the solids from the water; wherein the water-in-oil emulsion composition comprises:
   (a) 5% to 99% by weight of a water-in-oil emulsion polymer comprising:
      (i) 10% to 90% by weight of a hydrophobic oil phase;
      (ii) 0.5% to 10% by weight of a surfactant system; and
      (iii) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
   (b) 0.1% to 10% by weight of one or more inorganic microparticles;
   (c) 0.5% to 90% by weight of a carrier solvent; and
   (d) 0 to 90% by weight of a fluidizing agent.

59. The method of claim 58, wherein the oil phase comprises one or more oils selected from the group consisting of mineral oil, synthetic oil, modified oil, paraffinic oil, benzene, xylene, toluene, mineral oils, kerosene, naphthas, petroleums, blends of aromatic and aliphatic hydrocarbons containing 4 or greater carbon atoms, and vegetable oil.

60. The method claim 58, wherein the surfactant system comprises one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylates with 1 to 30 oxypropylene units, $C_6$-$C_{22}$ linear or branched alkyl ethoxylates/propoxylates with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, and ethylene oxide condensates of fatty acid amides.

61. The method of claim 58, wherein the repeat units from an acrylamide monomer comprise one or more repeat units according to Formula I:

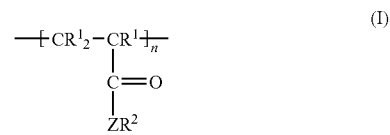

wherein each occurrence of $R^1$ is independently selected from H, methyl and ethyl, n is an integer from 10 to 10,000,000, Z is $-NR^2-$, and each occurrence of $R^2$ is independently selected from the group consisting of H, $C_1$-$C_{22}$ linear, branched or cyclic alkyl, aryl, alkaryl, aralkyl or alkenyl, a group $-R^3-NR^2{}_2$, a group $-R^3-N^+R^2{}_3 X$, and a group $-R^3-SO_3Y$, wherein $R^2$ is as previously defined, $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide), Y is H or an alkali metal ion, and X is a halide or methylsulfate.

62. A water-in-oil emulsion composition consisting essentially of:
   (a) 5% to 99% by weight of a water-in-oil emulsion consisting essentially of:
      (i) 10% to 90% by weight of a hydrophobic oil phase;
      (ii) 0.5% to 10% by weight of a surfactant system; and
      (iii) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
   (b) 0.1% to 10% by weight of one or more inorganic microparticles;
   (c) 0.5% to 90% by weight of a carrier solvent; and
   (d) 0 to 90% by weight of a fluidizing agent,
   wherein each of the above weight percentages is based upon the total weight of the composition.

63. A fracturing fluid consisting essentially of the mixture provided by adding a water-in-oil emulsion composition to water, wherein the water-in-oil emulsion composition consists essentially of:
   (i) 5% to 99% by weight of a water-in-oil emulsion consisting essentially of:
      (i) 10% to 90% by weight of a hydrophobic oil phase;
      (ii) 0.5% to 10% by weight of a surfactant system; and
      (iii) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
   (ii) 0.1% to 10% by weight of one or more inorganic microparticles;
   (iii) 0.5% to 90% by weight of a carrier solvent; and
   (iv) 0 to 90% by weight of a fluidizing agent,
wherein each of the above weight percentages is based upon the total weight of the composition.

* * * * *